June 23, 1959 J. GREISMAN 2,892,039

CUING METHOD AND SYSTEM

Filed Sept. 13, 1956

INVENTOR.
JACK GREISMAN
BY D Malcolm
ATTORNEY 2,892,039

CUING METHOD AND SYSTEM

Jack Greisman, New York, N.Y.

Application September 13, 1956, Serial No. 609,747
2 Claims. (Cl. 179—100.1)

Figures 1, 2:
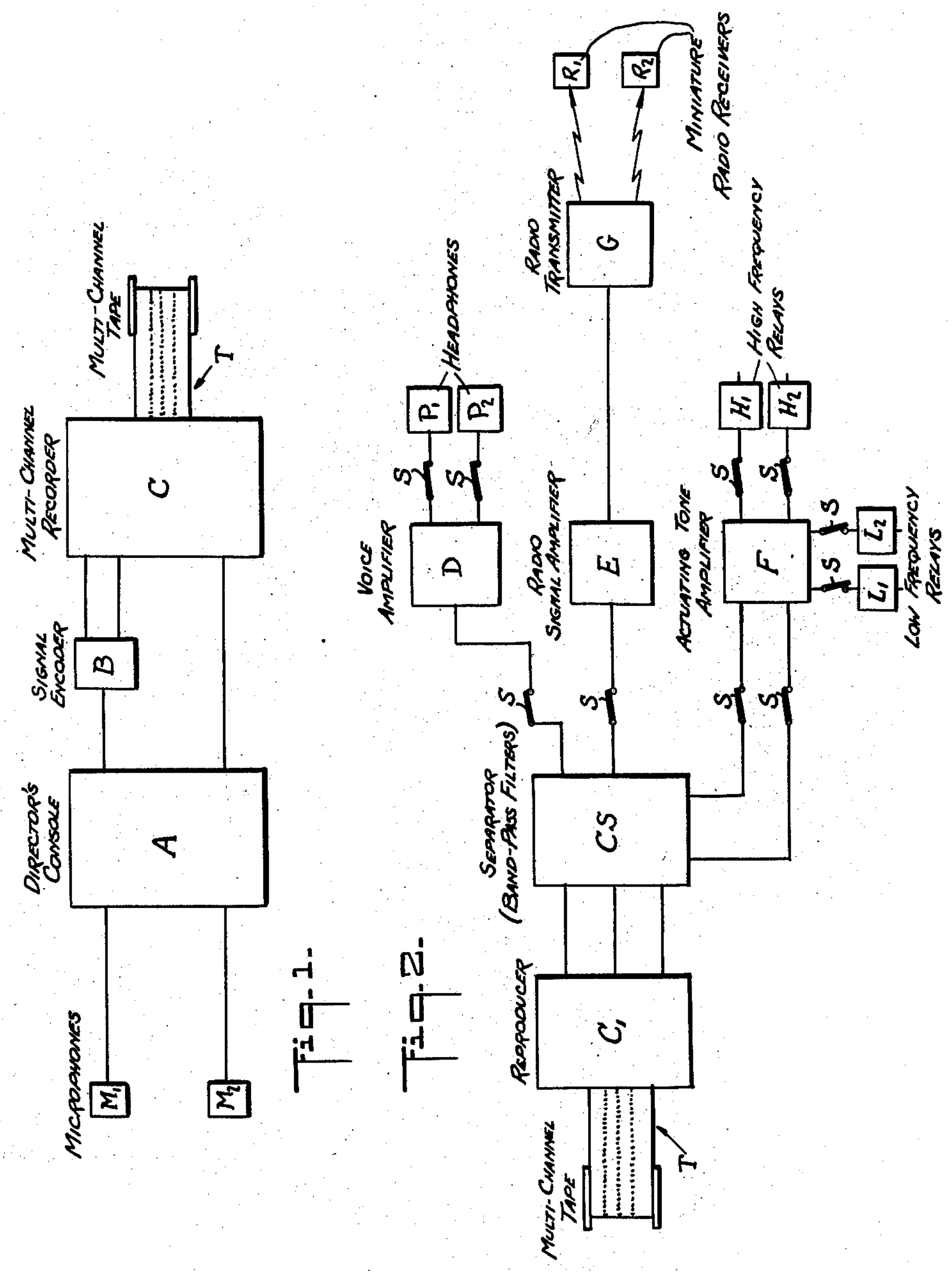

This invention relates to automatic and semi-automatic cuing system for controlling the production and presentation of radio and television shows, motion picture films, drama performances, etc., and it has for its object to provide a novel and improved method and system for this purpose.

Another object of the invention is to control the presentation of programs of the above type by recording essential cues, signals, "prop-actuating" impulses, etc., on a recording medium such as a magnetic tape or wire, photographic film, record disc or the like, all in predetermined sequence at proper time intervals, and in separate tracks or channels when required, and, during presentation of the program, to reproduce and distribute the recorded information in a manner to insure its faithful and timely presentation.

Still another object is to provide a system of the type specified in which the recorded information may be reproduced at a fixed speed, or accelerated or decelerated depending upon the time requirements of the program, and in which any recorded channel or channels may be by-passed so that the program director may give his instructions verbally or manipulate apparatus manually to supersede the recorded signals.

Various other objects and advantages will be apparent as the nature of the invention is more fully disclosed.

In a simple radio or television program in which, say, a commentator discusses the news of the day without using any special lighting or sound effects, there is little or no need for an automatic cuing system. The speaker may simply time himself by glancing at a clock, and, if he still fails to conclude on time, he can be unceremoniously cut off the air with a brief final word from the announcer. Cuing may even be unnecessary in broadcasting or televising an act from a live drama in which the actors, from long experience with the subject, are letter-perfect in a particular play.

However, in most radio and television productions, requiring changes in lighting effects and the rendition of timed sound effects such as ringing bells, clanging alarms, noises simulating animals, airplanes, etc., as well as split-second entrances, exits and other actions by various performers, especially performers who may have done little rehearsing, the need for accurately cuing all phases of the program is apparent. The present invention accomplishes the control and timing of all such performances accurately and efficiently through the novel cuing method and system hereinafter described, in which description the word "cuing" is used in its broadest sense to include not only the issuance of instructions to performers (for example via small hidden receivers carried by the actors) but also the operation (usually through electric relays) of camera changes, lighting effects, noise-making machines, etc.

In carrying out the invention, all the necessary cues, signals and messages are determined in advance of recording. During rehearsal or preparation of the program these signals (verbal messages or code signals, machine operating impulses, etc.) are recorded, punched, photographed or otherwise impressed on the recording medium, for example a recording tape operated at a given speed. At the performance, these signals are repeated to the personnel concerned, and/or to the machinery or other devices used in the play, film or sound recording.

The recording medium describes or signals the procedure, words, actions and other information for each step of the program, and at the correct time. The said medium may be, for example, a multi-channel photographic recording tape which may readily be duplicated if desired. Various information may be recorded on one or more tracks or channels as needed, and the channels may be switched to be received by different persons or devices as required. The reproducing device upon which the recorded material is played back may be operated at a fixed speed or accelerated or decelerated depending upon the time requirements of the show. Furthermore, any channel or channels may be by-passed to permit the program director to give his instructions verbally, or to manipulate a device manually to supersede the recorded signals. For certain applications switching signals may be recorded to automatically operate audible or visible signals, light dimmers, special effects and machines through the use of relays or electrical, electronic or mechanical starting, stopping or speed-changing devices. Signals may be recorded on the tape or other medium in various bands of the spectrum within the freqeuncy range of the material used. When played back, the frequencies may be separated into bands by conventional means and directed into their proper channels. More than one recorder or recording medium may be used simultaneously where speed changes in one group would interfere with the speed of another group.

In applying the system of the present invention to television shows, for example, during dress rehearsal all cues are recorded. Signals for machinery, camera changes and other mechanical operations are automatically encoded and recorded on the tape. If an error is made, the tape is rewound and the error corrected. At the actual performance the previously recorded signals actuate the machines to which they are directed. At the same time, voice signals to the crew, recorded during rehearsal, are played back to cue their activities. Performers may wear hidden radio receivers to pick up signals or they may receive their lines from a teleprompter device which in turn is controlled by signals from the tape. If the show is running too fast for the allotted time the tape may be slowed or, conversely, it may be speeded up for shows taking too much time. The director may, at any time, cut out the automatic mechanism of any or all channels and proceed manually and verbally to direct the proceedings.

The invention is described more in detail in connection with a preferred embodiment illustrated in the accompanying single sheet of drawings, in which:

Fig. 1 is a diagrammatic illustration of a system for recording cues in accordance with the present invention; and Fig. 2 is a diagrammatic illustration of a system for reproducing cues during presentation of a program pursuant to the invention.

The cue recording system diagrammatically illustrated in Fig. 1 comprises a plurality of microphones such as microphone $M_1$ for voice messages to operating personnel, and microphone $M_2$ for voice cues to actors, etc. These microphones are electrically connected to the technical director's console A where, among other things, the volume of the messages may be controled before they are impressed on the recorder. A signal generator or encoder B is electrically connected to the console A and to the input of the multi-channel signal and voice recorder C, for translating switching impulses into different tonal frequencies. The console A is also electrically connected directly to the recorder C as illustrated.

During rehearsal, voice messages from both director and technical director are spoken into microphones $M_1$ and $M_2$, and these are impressed by way of the control console A upon the recorder C. The switching impulses for cameras, lights, noise-making machines, etc., are fed from A to the encoder B which translates them into various tonal frequencies or other signals which are also impressed on the recorder C. In the embodiment illustrated herein, the output or end product of the recorder C is a continuous tape T of suitable width upon which all of the messages and signals referred to above are recorded, magnetically, photographically or otherwise, in a plurality of separate spaced tracks, channels or bands as indicated in Fig. 1.

In the case of magnetic tape recording, each magnetic band on the tape T may carry a full frequency band of signals which may subsequently (during presentation of the program) be separated by dividing networks such as band pass filters and directed into its allotted channel for actuating or regulating its own device or personnel. For example, a 1/16 inch width of tape may have recorded on it fifteen separate sets of signals (assuming a total frequency range of 15,000 cycles) each having a width of 1,000 cycles. To prevent adjacent channel interference a margin of a certain number of cycles may be left unused. The number of bands used is limited only by the frequency spectrum of the material and the effective width (cycles per second) of the band required. For a simple signal only a very narrow band width is necessary, so that many more bands are available. The bands may also be infra or ultra sonic if more signals are required. The number of information bearing channels may be increased by increasing the number of recording pick-up heads. The width of the individual bands of the tape may be narrowed and the number of heads increased. To prevent physical and magnetic interference between the heads they may be positioned in a diagonal pattern or staggered across the width of the tape.

During the presentation of the program, as represented in Fig. 2, the tape T is fed into the reproducer or playback $C_1$ which feeds all of the information to the separator CS. The separator CS in turn directs the information to various channels D, E, F, etc., only three such channels being illustrated in Fig. 2 in order to simplify the showing. From the voice amplifier D messages are relayed by wire to headphones $P_1$, $P_2$, etc. From the radio signal amplifier E, messages are sent to radio transmitter G which broadcasts them to miniature radio receivers $R_1$, $R_2$, etc. carried by performers, technicians, etc. Actuating pulses or tones are sent from CS to amplifier F which in turn relays them to equipment which is started, stopped or changed in speed by suitable relays. Fig. 2 shows two sets of two relays each; $H_1$ and $H_2$ which may be tuned to high frequency tones, and $L_1$ and $L_2$ which may be actuated by low frequency tones.

It will be evident from the foregoing that during rehearsal of a live performance, or during actual filming of a program subsequently to be reproduced on television for example, all the cuing signals pertaining to the various sound and/or visual effects required for the final presentation of the program are recorded in a plurality of separate, or mutually exclusive, tracks or channels on the tape T as diagrammatically illustrated in Fig. 1. Now, assuming that the program finally to be presented is a "live" television show, albeit with little previous rehearsal, the cue-reproducing system of Fig. 2 is set in operation at the start of the program. The moving tape T in Fig. 2 contains a plurality of separate tracks or channels, one of which, for example, may consist of spoken instructions to actors to start dancing, to walk off the stage, etc., which instructions the actors will hear at the proper time through their miniature receivers such as $R_1$ and $R_2$. Another of said tracks or channels may contain either high or low frequency tones which, at the proper times, will actuate relays $H_1$ and $H_2$, and relays $L_1$ and $L_2$, to operate noise-making machines, etc. Still another track or channel may consist of signals or spoken instructions to technicians (heard through headphones such as $P_1$ and $P_2$) to change the lighting in some desired way.

The signal separator or decoder CS may include any suitable arrangement of tuned circuits, band pass filters, etc., the function of which is to direct the signals recorded on separate tracks or channels of taped T to the proper amplifiers D, E, F, and so on. The signals or messages contained on tape T, having been recorded on said tape in the proper sequence and at the correct time intervals, will of course be reproduced in the same correct order. However, the program director may at any time stop the reproduction of signals from any given channel merely by operating any one of the switches S in the reproducing system of Fig. 2, for example by simply opening the circuits leading from the signal separator CS to any of the amplifiers D, E and F. In such case the director may substitute for the by-passed channel or channels his own verbal instructions, transmitted through amplifiers D, E or F or through separate signaling means, not shown, or he may personally operate the noise-making apparatus, etc. which would ordinarily be operated automatically as previously explained. By changing the speed of the tape T in Fig. 2, the director may speed up or slow down the presentation of the program as required.

The invention claimed is:

1. A system for cuing a program comprising a movable recording medium having cues such as spoken words, signals, etc. recorded thereon in a plurality of separate channels in the sequence and at time intervals determined by the order of their presentation during a performance, means for lengthening or shortening the program time by varying the speed of said medium during said performance, means for reproducing said cues during said performance in the sequence in which they are recorded on said medium, means for separating said reproduced cues and directing same into separate transmission paths according to their character as spoken words, signals, etc. to cue said performance, and switching means for selectively interrupting said separate transmission paths to interrupt cues of a given character without affecting the transmission of cues of a different character.

2. A system for cuing a program comprising a movable recording medium having cues such as spoken words, signals, etc. recorded thereon in a plurality of separate channels in the sequence and at time intervals determined by the order of their presentation during a performance, means for lengthening or shortening the program time and decelerated by varying the speed of said medium during said performance, means for reproducing said cues during said performance in the sequence in which they are recorded on said medium, means for separating said reproduced cues and directing same into separate transmission paths according to their character as spoken words, signals, etc., a plurality of circuits associated with each of said transmission paths each including a cuing device individually operable by cues of the character transmitted by the associated transmission paths, switching means for individually interrupting each of said circuits without affecting any of the other circuits, and switching means for separately interrupting said separate transmission paths to interrupt all cues of a given character without affecting the transmission of cues of a different character.

References Cited in the file of this patent

UNITED STATES PATENTS

| | | |
|---|---|---|
| 1,909,765 | Jenkins et al. | May 16, 1933 |
| 2,101,121 | Wixon | Dec. 7, 1937 |
| 2,529,097 | Mullin | Nov. 7, 1950 |
| 2,633,055 | Badmaieff | Mar. 31, 1953 |
| 2,714,633 | Fine | Aug. 2, 1955 |
| 2,789,679 | Vandivere | Feb. 5, 1957 |